United States Patent [19]

Van de Capelle et al.

[11] Patent Number: 5,268,754
[45] Date of Patent: Dec. 7, 1993

[54] METHOD AND A DEVICE FOR CONVERTING A COLOR COORDINATE SET

[75] Inventors: Jean-Pierre Van de Capelle, Ghent; Karel Roose, Kortrijk; Eddy Debaere, Deinze-Astene; Daniël Pletinckx, Maarkedal, all of Belgium

[73] Assignee: Barco Graphics N.V., Ghent, Belgium

[21] Appl. No.: 842,541

[22] Filed: Feb. 27, 1992

[30] Foreign Application Priority Data

Mar. 1, 1991 [BE] Belgium .............................. 09100194

[51] Int. Cl.$^5$ .............................................. H04N 1/46
[52] U.S. Cl. .................................. 358/527; 358/500; 382/17
[58] Field of Search ................ 358/75, 78, 80, 22, 358/28; 395/131; 382/17

[56] References Cited

U.S. PATENT DOCUMENTS

| | | |
|---|---|---|
| 4,620,792 | 8/1989 | Suga . |
| 4,670,780 | 6/1987 | McManus et al. ............. 358/75 |
| 4,998,286 | 3/1991 | Tsujiuchi et al. ............. 382/17 |
| 5,121,196 | 6/1992 | Hung ........................... 358/80 |
| 5,208,911 | 5/1993 | Newman et al. ............. 358/80 |

FOREIGN PATENT DOCUMENTS 203448 12/1986 European Pat. Off. .
2213674 8/1989 United Kingdom .

OTHER PUBLICATIONS

Patent Abstract of Japan, vol. 15, No. 18.
P. Laihanen, "Optimization of Digital Color Reproduction on the Basis of Visual Assessment of Reproduced Images" Proceedings of the SID, vol. 30/3, 1989, pp. 183–190.
Hans E. J. Neugebauer, "Die theoretischen Grundlagen des Mehrfarbenbuchdrucks", J. Tech. Phys., vol. 36, No. 22, Apr. 1937, pp. 73–89.
Gunter Wyszecki, et al., "Concepts and Methods, Quantitative Data and Formulae" John Wiley & Sons, 2d Edition, pp. 891–892, 164–169.

*Primary Examiner*—Edward L. Coles, Sr.
*Assistant Examiner*—Kim Yen Vu
*Attorney, Agent, or Firm*—Cushman, Darby & Cushman

[57] ABSTRACT

A method and a device for converting a color defined in a first n-dimensiontal device dependent color space to a corresponding color defined in a second m-dimensional ($m \geq n$; $n \geq p$; $m > p$; $p \geq 3$) device dependent color space, wherein for each $(m-p)^{th}$ color dimension from the second device dependent color space there is each time defined a color value and said color coordinate set of the second device dependent color space is determined on the basis of said color value.

27 Claims, 5 Drawing Sheets

METHOD AND A DEVICE FOR CONVERTING A COLOR COORDINATE SET

The invention relates to a method for converting a color defined in a first n-dimensional device dependent color space to a corresponding color defined in a second m-dimensional (m>n; n>p; m>p; p>3) device dependent color space, wherein the color is first converted from the first device dependent color space to a first device independent color space and thereafter from the first device independent color space to a second device independent color space in order to be there after converted to the second device dependent color space, and wherein for each conversion from the one color space to the other there is determined a respective mapping algorithm mapping a color coordinate set from said one color space to said other color space, and wherein each device dependent color space comprises a color gamut and the color gamut of said first respectively second device dependent color space is each time by means of said respective mapping algorithm mapped to the first respectively second device independent color space in order to each time define therein a first respectively a second color gamut which is correlated with the first respectively the second device dependent color space and subsequently there being verified if the color coordinate set converted from the first to the second device independent color space is within the correlated color gamut defined within the second device independent color space.

Such a method is known from the article of Pekka Laihanen, entitled "Optimisation of digital color reproduction on the basis of visual assessment of reproduced images" and published in Proceedings of the SID, Vol. 30/3, 1989, p.183-190. This article describes a method for converting a color defined in a RGB color space to a corresponding color in a CMYK space. This conversion allows a color image represented for example on a television screen, operating according to an additional color principle, to be represented on a carrier, such as for example a piece of paper wherein a substractive color principle is used. In this manner it is possible to take into account characteristic color parameters of the carrier and thus to determine a color coordinate set which is appropriated for the carrier. In order to apply the necessary mathematical manipulations on the coordinate set the conversion is carried out via a device independent color space, in the present case via the CIE 1976 L*a*b* space. In this space, the manipulations such as luminance adjustment, contrast mapping, color temperature adjustment and color gamut mapping can easily be carried out, whereby a transformation from a device dependent to a device independent color space and vice versa are performed according to a standardized pattern. Because each device dependent color space has its own color gamut, it is necessary to check if by a conversion the transformed color is within the color gamut of the second color space (gamut mapping). To this purpose the color gamut of the first resp. second device dependent color space is mapped to a first resp. a second device independent color space in order to define there a color gamut which is correlated with the device dependent color space. The verification if the transformed color coordinate set is within the second color gamut is then realized in the second device independent space.

A drawback of the known method is that when a coversion has to be realized to a second device dependent color space having a dimension larger than the one (m=p) of the second device independent color space, no appropriate solution is provided for those (m−p) color dimensions exceeding than the dimension of the second device independent color space.

The purpose of the invention is to realize a method providing a solution to the present problem.

A method according to the present invention is therefore characterized in that for each $(m-p)^{th}$ color dimension from the second device dependent color space there is each time defined a color value and said color coordinate set of the second device dependent color space is determined on the basis of said color value, which color value defines a further color gamut within the color gamut of the second device dependent color space, which further color gamut is mapped by means of said respective mapping to the second device independent color space in order to define there a third color gamut and if by said verifying there is established that the converted color coordinate set is outside the third but within respectively outside the correlated second color gamut that color coordinate set is substituted by a first respectively a second color coordinate set. By defining for each $(m-p)^{th}$ color dimension a color value, the latter is unambiguously defined and thus a solution is provided for those color dimensions of the second device dependent color space which exceed the dimensions of the second device independent color space. Thanks to the unambiguous definition of the color value, it is also possible, when there is established that a color coordinate set is outside the color gamut, to substitute the latter by a further color coordinate set thus obtaining a true color reproduction.

A first preferred embodiment of a method according to the invention is characterized in that for the color value, a value is chosen in function of the color values of the remaining color dimensions. The chosen color value will thus act as a full color. Further this allows to make color reproductions during printing processes with other inks than the standard CMYK process inks, such as for example PMS-inks (Pantome inks, HKS-inks).

It is favourable that for the color value, a value is chosen in function of a minimum value of the remaining p color coordinates. So, the third color gamut is a subset of the second color gamut and the determination of the first color coordinates becomes easier. Printing processes thereupon lead to a better printing quality and printing reproduction as with the other inks, such as for instance the black ink of CMYK, which are solely added when the other inks already have given a sufficient contribution and this of course in as far as is allowed with the color reproduction.

A second preferred embodiment of a method according to the present invention is characterized in that said second color set is determined by projection of the color coordinate set, obtained by mapping to the second device independent color space on a boundary plane of said correlated second color gamut. This enables to obtain a second coordinate set that is certainly within the correlated second color gamut without infringing too much the color impression.

A third preferred embodiment of a method according to the present invention is characterized in that said second color coordinate set is obtained by determining for at least one of the color parameters hue, luminance and saturation, the difference between said second color coordinate set obtained by projection and said color coordinate set obtained by mapping to the second device independent color space. By first determining said difference and thereafter minimizing it, the color impression remains and shifts in the color are limited to a minimum. Thereupon this allows to accord more importance to certain differences, such as for example the differences in hue, than to for example differences in luminance. The relative importance of each difference can further change according to the color coordinate set to be determined.

It is favourable that said minimization comprises a minimization of the color distance in the Euclidian space. The color distance in such a perceptual uniform space can be minimized in a reliable manner thus limiting the visual differences.

A fourth preferred embodiment of a method according to the invention is characterized in that said first color coordinate set is determined by defining for each $(m-p)^{th}$ color dimension of the second device dependent color space a further color value, and wherein on the basis of said further color value there is determined in the second device independent color space a fourth color gamut which is included within said second color gamut and which comprises at least partially said third color gamut. By defining a further color value, the differences between the transformed color coordinate obtained by mapping from the first to the second device independent space and the color coordinate to be substituted can be further minimized.

It is favourable to determine said further color value an inverse mapping is made of said color coordinate obtained by mapping from said second device independent color space to said second device dependent color space and wherein for said further color value a value is chosen determined on the basis of the result of said inverse mapping. The further color gamut is thus unambiguously determined.

A fifth preferred embodiment of a method according to the invention is characterized in that by converting a first color coordinate set of the first device dependent color space to a corresponding color coordinate set of the second device dependent color space, use is made of an interpolation between predetermined color coordinates. The transformation operation can thus be realized in an efficient manner without using either a giant memory capacity or a long calculation time or a large calculation capacity.

A sixth preferred embodiment according to the present invention is characterized in that for determining of said predetermined color coordinates, the first device dependent color space is subdivided in geometrically each time substantially uniform subspaces wherein each subspace is delimited by corner points, and for each corner point the corresponding color coordinate set of the second device dependent space is stored into a memory. The division in subspaces enables to obtain a structure in the data to be stored into the memory. Thereupon the subdivision in each time uniform subspaces allows to use a finer division in certain areas of the color space, improving the quality of the reproduction.

It is favourable that the subspaces are formed by tetrahedrons. Tetrahedral interpolation has the advantage that the banding phenomena in the image can be substantially reduced and that image details are better conserved.

A seventh preferred embodiment of a method according to the invention is characterized in that for said identifying of the subspace, use is made of the most significant bits of the color coordinate set to be converted in order to determine a first corner point of the subspace to be identified and wherein the remaining corner points of the subspace to be identified are identified by incrementation of said most significant bits. A partition realized on the basis of the most significant bits simplifies substantially the hardware.

An eight preferred embodiment of a method according to the present invention is characterized in that on the basis of the least significant bits of the color coordinate set to be converted weight coefficients are selected which represent the contribution of said color coordinate set to each second color coordinates which are related to the angle points of the identified subspace. The interpolation operation thus becomes easier.

The invention also relates to a device for performing the method.

The invention will now be described in more details by means of the preferred embodiments shown in the drawings. In the drawings.

In the drawings a same reference has been assigned to a same or analogous element.

Each device suitable to represent a color image, be it a color television monitor or a color printing device, has a device dependent color space wherein the color to be represented is defined. So for example the television monitor has a three-dimensional color space, better known under the name RGB-space and an offset printing device a four-dimensional color space, namely the CMYK space. A color in a defined color space is then represented by a color coordinate set expressed in coordinates of that color space.

Figure 1:
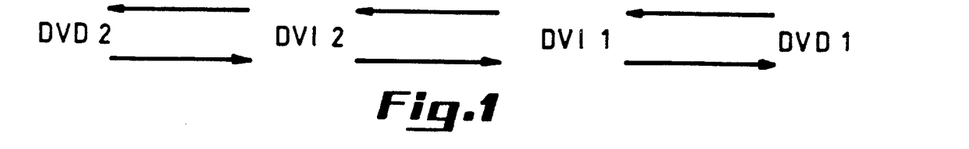
FIG. 1 shows the transformation via device independent spaces.

When now a color picture represented in a first device dependent color space, such as for example the RGB space, has to be reproduced in a second device dependent color space, such as for example the CMYK space, a transformation from the one color space to the other is necessary. Such a transformation is however not directly realized but via a device independent color space. FIG. 1 shows schematically such a transformation. The color coordinates represented in a first device dependent color space DVD1, such as for example the RGB-color space, is converted to a first device independent color space DVI1, such as for example the CIE L*a*b* or L*u*v* color space. Those device independent color spaces are known as such and are for example described on pages 164–169 of the book entitled "Color Science, Concepts and Methods, Quantitative Data and Formulae" of G. Wyszerki and W. Stiles, published by John Wiley & Sons. The transformation of a first device dependent color space to a first device independent color space is realized by means of mapping algorithms known as such. By using device independent color spaces it is possible to realize color conversion between substantially all kinds of devices for color representation.

The conversion from a device dependent (DVD) to a device independent space (DVI) is realized by means of mathematical device models and/or test-patterns which are measured by means of a colorimeter. By using a device independent color space, it is also possible to realize color conversions between different device independent color spaces, wherein each color space comprises its own reference light source. These conversions serve for example for luminance adaption, contrast mapping, color temperature mapping and color gamut mapping.

Color gamut adaption is generally necessary by reproduction of a picture from one medium to another, because different media have different color reproduction in such a manner that sometimes a color in one medium cannot be generated in the other one and vice versa. Each medium has indeed its own color gamut in the device dependent color space. By a mapping of the color gamut of a device dependent color space to a device independent color space, a color gamut is defined in the device independent color space which color gamut is correlated with the one in the device dependent color space. In such a manner use is made by a conversion from a first medium to a second medium of a conversion between a first device independent color space DVI1 and a second device independent color space DVI2 belonging to the first resp. the second medium. Starting from the second device independent color space DVI2, a transformation is again realized to a second device dependent color space DVD2.

A conversion algorithm for the conversion of the one color space to another is for example the Neugebauer equation (J. Tech. Phys. Vol. 36 No. 22 1937). When the dimension of the first and the second device dependent color space is equal to the dimension of the device independent color space, the conversion can easily and unambiguously be realized. When however the first device dependent color space is n-dimensional and the second is m-dimensional (m≧n; n≧p; m≧p; en p≧3) such as for example by a RGB→CMYRK transformation, then (m−p) coordinates are free to chose. Solving the conversion algorithm implies however that a percentage of each color for a point to be represented is known.

By the method according to the invention there is now for each $(m-p)^{th}$ color dimension in the second device dependent color space each time defined a color value. So for example for a RGB→CMYK conversion a color value is defined for the fourth color dimension, being the color black (K). This color value is then used to determine the color coordinate set in the concerned color space. So, the color values are defined for the $(m-p)^{th}$ color dimensions and the conversion algorithm can unambiguously be solved.

Figure 2:
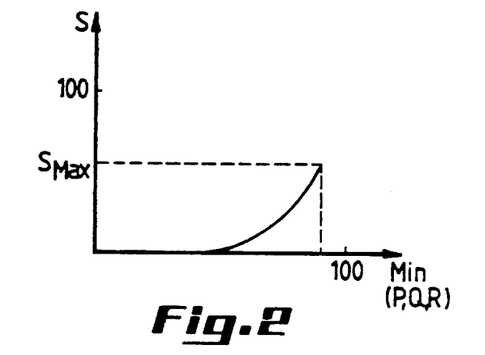
FIG. 2 shows a function defining a fourth color value in function of the remaining three color values.

As an example of a conversion from a first n- to a second m-dimensional color space, a conversion from a three-dimensional XYZ, such as for example the RGB-space, to a fourth-dimensional color space PQRS, such as for example the CMYK space, will now be described. Further there is supposed that the dimension p of the device independent color space equals 3. It will be clear that this is only a choice made to simplify the description. Because there is transformed from a three-dimensional device independent to a fourth-dimensional device dependent color space, it is necessary to determine a color value for the fourth-dimension imposing an extra relation. This can be done by different ways such as for example chosing the S-value as a function f of the remaining values, S=f(P,Q,R). That function f can represent any arbitrary relation and may for example be a relation indicating a fixed value, such as for example a constant or a relation indicating a variable value, such as for example a mean value of the remaining colors (PQR) or a function of the minimum of the remaining values. FIG. 2 illustrates such a function wherein Smax is a fixed maximum while 100 being the physically realisable maximum. By the conventional positive offset printing that relation indicates for example the black separation. The color dimension black is, in the method according to the invention, not only used for luminance modulation of the image to be formed but is also valid as a full printing ink. So, the technics as GCR (Gray Component Replacement) and UCR (Under Color Removal) are possible. The use of the color black makes it possible to form a contrast richer image by the partial substitution of CMY colors by black.

Figure 3:
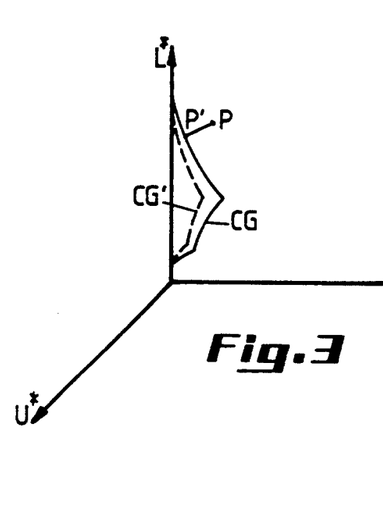
FIGS. 3 and 4 illustrate the color gamut concept.

The chosen relation does not have to be strictly respected under all circumstances, because under certain circumstances this could lead a converted color coordinate set which is outside the color gamut, such as defined in the device independent space. Such a situation occurs for example if $k_{max}<100$ and if a color corresponding with c=m=y=k=100 has to be reproduced. That color clearly does not satisfy the imposed relation because $k_{max}<100$. The chosen relation has thus to be infringed. The concept "color coordinate set outside the color gamut" is illustrated in FIG. 3, where a CIE L*u*v* space is represented. In that FIG. 3, the plain line CG indicates the boundary of the color gamut, while the broken line CG' indicates the boundary of a further color gamut obtained by starting from CG and applying a saturation contraction while maintaining hue and luminance. The point P indicates a color coordinate set which is clearly outside the color gamut CG'. In order to form that color belonging to P, it is necessary the infringe the chosen relation. In order now to deviate as less as possible from this color even as of the relation, there are several possibilities which will be described hereunder.

Figure 4:
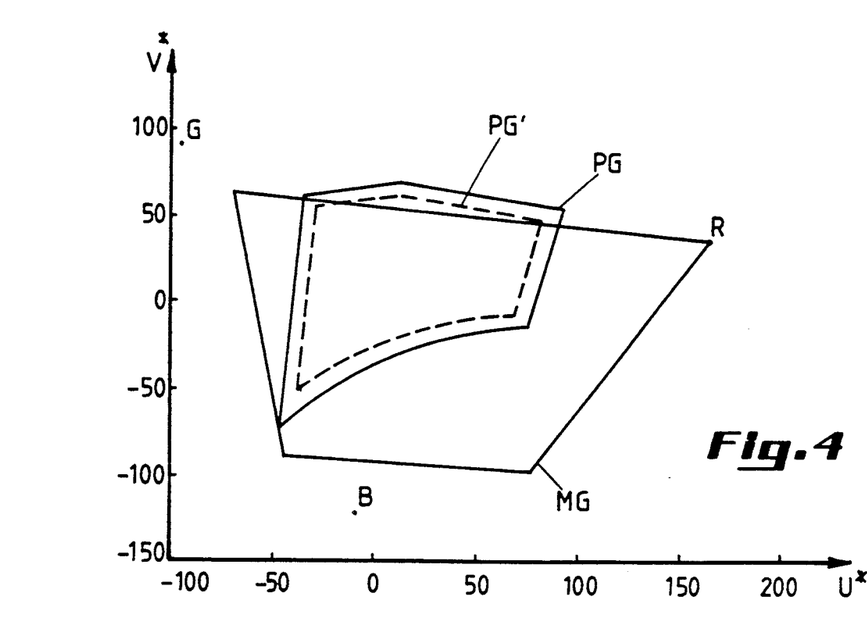

Once the relation is fixed, a mapping is determined from the (PQRS(PQR)) color space obtained from the second device dependent color space to the device independent XYZ color space by taking into account that relation. This mapping defines then in the device independent color space a third color gamut which is correlated with that (PQRS(PQR)) device dependent color space and which is different from the collerated second color gamut obtained by mapping the PQRS color space. The result of such a mapping is shown in FIG. 4, wherein on the horizontal resp. vertical axis the U respectively V coordinates of en LUV device independent space are represented. The surface MG respectively PG represents the color gamut of a RGB respectively CMYK space with a luminace of 60. The surface PG' indicates a third color gamut of the CMYK(CMY) color space.

By the mapping PQRS(PQR)→XYZ there is thus formed a correlated third color gamut in the device independent space. The boundary values of that color gamut are for example determined by P=0, Q=0, R=O, P=100, Q=100 and R=100. Pursuant the gamut boundaries of the PQRS color space are determined. For this purpose, two of the PQRS values are kept constant on their maximum or minimum, i.e. 100 or 0, while the two other values describe a plane in the device independent color space XYZ. By way of example, the P and Q values are now kept constant providing the four following possibilities:

P=0, Q=0
P=100, Q=0
P=0, Q=100
P=100, Q=100.

Figure 5:
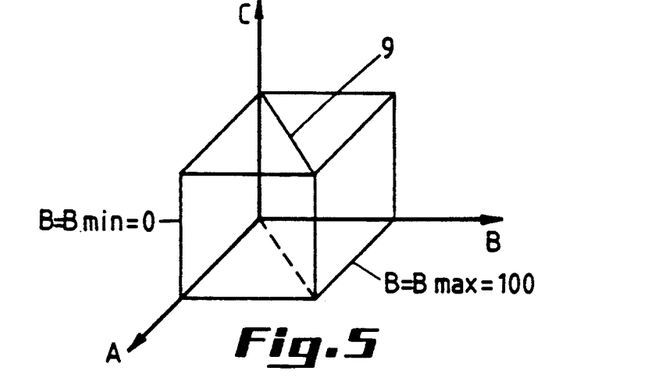
FIGS. 5, 6 and 7 illustrate the concept boundary plane of a color gamut.

FIG. 5 shows this situation for the three-dimensional space. In this figure the plane $B=B_{min}$ respectively $B=B_{max}$ represents the minimum respectively the maximum color value. There is now verified which are the boundary planes of the color gamut. To this purpose use is made on a perpendicular vector $\bar{u}_n$ on that plane and the following gradient vectors are defined:

$$\bar{u}_3 = -sign(t_3-100) \cdot (dX/dt_3, dY/dt_3, dZ/dt_3)$$

$$\bar{u}_4 = -sgn(t_4-100) \cdot (dX/dt_4, dY/dt_4, dZ/dt_4)$$

wherein $t_3$ and $t_4$ are constant PQRS values. $sgn(X)=1$ if $X \geq 0$ and $sign(X)=-1$ if $X<0$.

Figure 6:
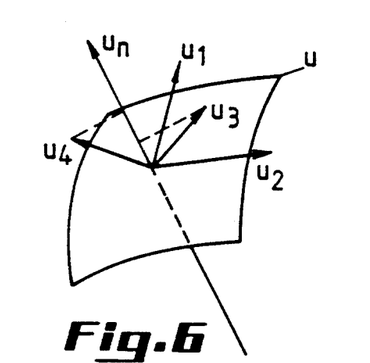
Figure 7:
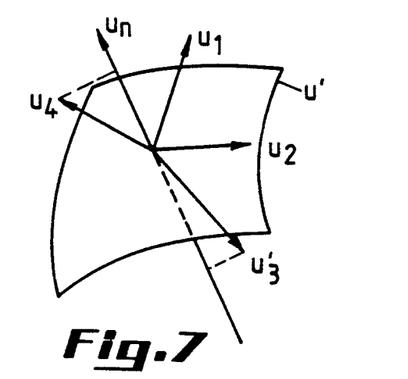

FIGS. 6 and 7 show the concept gradient vector and boundary plane. In the FIG. 6, $\bar{u}_1$ and $\bar{u}_2$ belong to the tangent plane to plane u and the standard vector $\bar{u}_n$ is perpendicular to the tangent plane to plane u. The vectors $\bar{u}_1$ and $\bar{u}_2$ are defined by:

$$\bar{u}_1 = (dX/dt_1, dY/dt_1, dZ/dt_1)$$

$$\bar{u}_2 = (dX/dt_2, dY/dt_2, dZ/dt_2)$$

wherein $t_1$ and $t_2$ are variable values PQRS describing the plane.

In order now to verify if the plane u is a boundary plane, the following operation is executed: $SP = (\bar{u}_3 \cdot \bar{u}_n) \cdot (\bar{u}_4 \cdot \bar{u}_n)$ i.e. the scalar product SP of the inproducts between the gradient vectors and the standard vector is determined. Pursuant there is verified if the scalar product $SP>0$. If this is the case, than the plane u is a boundary plane. The inproduct $\bar{u}_1 \cdot \bar{u}_n$ signifies the projection of the vector $\bar{u}_i$ on the standard vector such as shown in FIG. 6. If as well $\bar{u}_3 \cdot \bar{u}_n$ as $\bar{u}_4 \cdot \bar{u}_n$ gives a positive result so that SP is positive, then the plane u is a boundary plane.

In the example shown in FIG. 7, $\bar{u}_3' \cdot \bar{u}_n$ 0 because the perpendicular projection of $\bar{u}_3$ on $\bar{u}_n$ determines a vector which is oriented in the opposite side with respect to $u_n$. The plane u' is thus not a boundary plane.

It will be clear that the method described herebefore for determining a boundary plane is only given by way of example and that other methods are also applicable.

Figure 8:
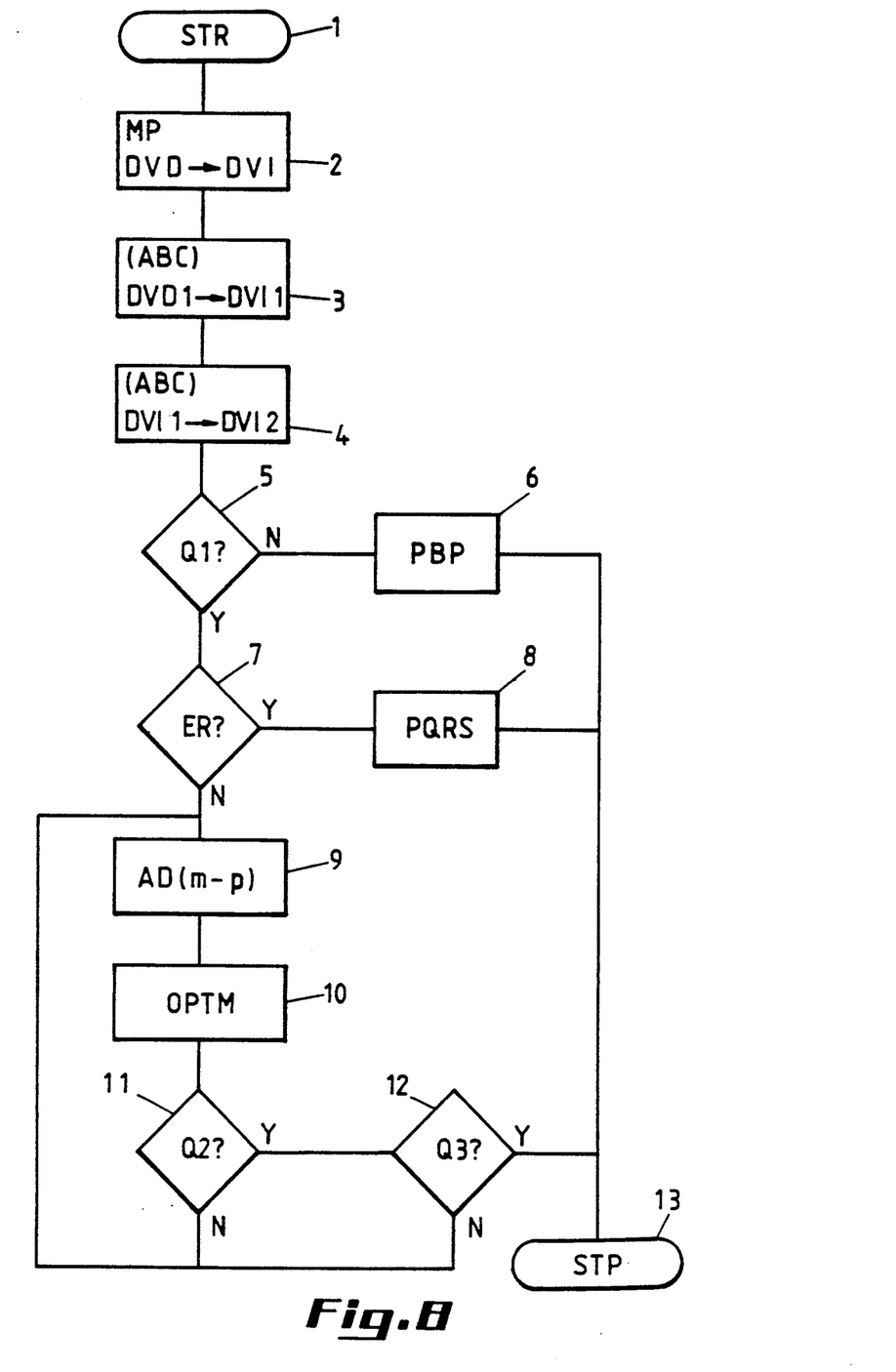
FIG. 8 shows a flow diagram representing the different steps of a conversion according to the invention.

The conversion of a color defined in the n-dimensional color space (A,B,C) to a corresponding color defined in a m-dimensional color space (PQRS) will now further be described by using the flow chart represented in FIG. 8. This flow chart is executed by means of a device, mainly a device, not represented in the figures, which is provided for executing a method according to the invention. The data processing device is provided with one or more microprocessors with appertaining memories.

For the sake of clarity, there is supposed by the description of the flow chart given in FIG. 8 that a choice of the device independent color space has been determined on beforehand. It is of course possible to chose another device independent color space for each conversion operation. For the latter it will then only be necessary to load into the memory the necessary mapping algorithms and the data identifying the color space.

By executing the conversion operation the data processing unit starts (1, STR) the program shown in the flow chart of FIG. 8. A first step which is executed is the mapping (2; MP DVD→DVI) of the color gamut of the first respectively second device dependent space to the first respectively second device independent space in order to determine in the device independent color space a color gamut which is correlated with the first respectively the second device dependent color space. Thereafter the conversion the first device independent space of a color coordinate set ABC defined in the first device dependent space (3; (ABC) DVD1→DVI1) is excuted and thereafter the transformation of that color coordinate set to the second device independent space (4,; (ABC) DVI1→DVI2).

There is now verified (5; Q1?) if the converted color coordinate as determined in the second device independent space belongs to the there defined color gamut which is correlated with the color gamut of the second device dependent color space. It has to be mentioned that here is only verified if the converted color coordinate is within the whole second color gamut such as obtained by mapping to the device independent space, without having imposed whatever additional relation to the colors of that PQRS space. In order to verify if the transformed color coordinate is within the whole color gamut, the color gamut has of course been defined on beforehand by i.a. determining the boundary planes as described herebefore. A possibility to verify if the transformed color coordinate is within the whole color gamut, is to determine the space angle under which the volume of the color gamut is observed from this color coordinate. If this space angle equals $4\pi$, than the coordinate is within the color gamut. If, on the other hand, the space angle equals $2\pi$, respectively 0, then the coordinate is on the boundary plane respectively outside the color gamut.

If there is now established that the transformed color coordinate is outside the color gamut (5 Q1?, N), then this signifies that this color cannot as such be represented in the second device dependent color space. An adaptation of that color coordinate is thus required. This adaptation can now for example be realized by projection (6, PBP) on the boundary planes of the correlated color gamut such as determined in the second device independent space. Such an operation is illustrated in FIG. 3 where the point P is situated outside the color gamut. Projection of the point P on the boundary plane CG of the device independent space provides a point P' whose coordinates are situated within the color gamut. As projection is for example chosen one in a plane with constant hue and whereby a minimization inside that plane in the device independent color space is applied.

Alternative methods, are for example determining and weighing the difference in luminance, saturation in hue before thereupon applying a minimization in the device independent space. On the basis of the point P' there is then determined a second color coordinate set PQRS in the second device dependent space which represents a color to be represented in that space. The determination of the PQRS coordinates closes also this procedure for this color coordinate set because these coordinates are used for substituting those which are situated outside the color gamut.

When however at step 5 (Q1?) is determined that the color coordinates are indeed situated within the color gamut (Q1;Y), there is verified (7,ER?) if the color coordinates are within the third color gamut which is part of said correlated color gamut of the second device independent space. Indeed by imposing an extra relation which is a function of the remaining colors, such as described herebefore, the color gamut is limited, since this extra relation defines each $(m-p)^{th}$ color dimension when started from a p-dimensional second device independent color space. The latter is illustrated in FIG. 4, where PG represent the second color gamut in the second device independent space and PG' the third color gamut which is part of that second color gamut PG and which is obtained by imposing an extra relation in the second device dependent color space. Because the extra relation imposes restrictions to the color space, this results in a limitation of the color gamut. The color gamut PG' is thus obtained by a mapping of the color gamut of the device dependent space obtained by taking into account the extra relation to the second device independent space.

It has thus to be verified if a color coordinate set which belongs to the second color gamut (PG) also belongs to the third color gamut (PG'). This is realized in an analogous manner as by step 5 (Q1?). If that color coordinate set indeed belongs to the third color gamut (ER;Y) then the PQRS coordinates can be formed without any problems (8, PQRS).

If however that color coordinate set does not belong to the third color gamut (ER;N) then a number of steps are required for determining the converted color coordinate set. In this way an adaptation operation (9: AD(m−p)) is applied on the (m−p) color values in order to reduce the color differences in the second device independent color space and to satisfy as good as possible to the extra relation. In the chosen embodiment of an n=3 (RGB; XYZ) to a m=4 (CMYK) color space where as extra relation the input of the color black (S=f(P,Q,R)) is not only chosen for the luminance modulation of the image but also as a full printing ink, the reduction of the color differences comprises that the "black condition" is minimized to $[S-S(P,Q,R)]^2$ with the restriction that there is satisfied to (X,Y,Z)=g(P,Q,R,S), wherein g represents a mapping of the second device dependent space to the second device independent space. The minimization of $[S-S(P,Q,R,S)]^2$ is the least mean square determination wherein S represents the actual value "ist wert" which is outside said third color gamut (PG') and S(P,Q,R) is the "soll Wert" and which is situated within said further color gamut. By this minimization of the color dimension in the Euclidian space a first substituted color coordinate set is obtained which has an as small as possible color difference and thus a good proximation of the desired color. Under Euclidan space, one understands a space wherein the distances are expressed as a sum of squares of the difference between the respective coordinates and wherein that distance is correlated with a visual difference. Such an Euclidian space is moreover a perceptual space which is as uniform as possible.

If the XYZ color is within the color gamut, it is possible to substitute S directly by S(P,Q,R). Because (X,Y,Z)=g(P,Q,R,S) is known, S is simply substituted by S(P,Q,R) and the non-linear set of equations (X,Y,Z)=g(P,Q,R,S)=f(P,Q,R,S(P,Q,R)) can be solved because there is a valid substitution for a non-defined fourth dimension. Solving this set is for example realized by numerical technics known as such, such as Newton-Raphson, Steepest Descent or Minimization.

After the adaptation operation of step 9, follows a optimization step (10; OPTM) wherein the color values of the three-dimensional space are optimized in order to obtain a minimum color difference in the second device independent color space between the color such as obtained by conversion of the first to the second device independent space (step 3) and the color determined on the basis of the actual PQRS values. This is for example realized by minimization techniques known as such.

Thereafter (11; Q2!) is verified if the color difference between the color obtained by the transformation step 3 and the color obtained on basis of the actual PQRS value is sufficient small. To this purpose, is checked if the color difference is smaller than a predetermined value representing a lower treshhold for a visual distinction. Such a lower treshhold is for example given by $\Delta E^*_{uv}=1$ wherein $\Delta E^*_{uv}$ is defined in the L*u*v* space by $\Delta E^*_{uv}=[(\Delta L^*)^2+(\Delta u^*)^2+\Delta v^*)^2]^{\frac{1}{2}}$. By a too big color difference (Q2; N) the steps 9 and 10 are repeated in order to minimize the color difference until a predetermined value is obtained.

In order to further minimize that color difference for each $(m-p)^{th}$ color dimension of the second device dependent color space, a further color value is defined. This is for example realized by chosing beside the already defined extra relation another relation which will extend the color gamut. The color gamut is then for example extended in such a manner that a fourth color gamut is created to which the color coordinate set, which was outside the third color gamut, will now belong. This fourth color gamut will for example be chosen by letting the latter color coordinate set coincide with the boundary of the fourth color gamut. The fourth color gamut comprises at least partially the third color gamut and is situated inside said correlated second color gamut.

Once the fourth color gamut is defined, an inverse mapping $g^{-1}(x,y,z)=(P,Q,R,S)$ of the mapping which maps the color gamut of the second device dependent color space in the second device independent color space is realized. By this inversed mapping, a value is obtained which serves to determine said further color value and said further relation.

The chosen extra relation is thus "adapted" in order to determine another relation which better approximates the color coordinate set to be obtained. The steps 9 and 10 are then repeated and use is hereby made of said further color value.

When the color difference is smaller than said predetermined value (Q2; Y) there is verified if the extra relation S=S(P,Q,R) was optimally satisfied, which signifies that there is checked if the color reproduction is as close as possible to the imposed relation. If this is not the case (Q5; N), then the minimization procedure (steps 9 and 10) is restarted. In the other case (Q3; Y), the determined first PQRS color coordinate set gives the color correctly within the determined visual boundaries and the procedure (13; SPT) is closed. The found first PQRS color coordinate set substitutes then the transformed color coordinate set.

Steps 5 Q1 ?, 6 PBP, 7 ER ?and 8 PQRS give a preferred embodiment allowing a faster achievement. With another embodiment, steps 5,6,7 and 8 are not executed and steps 9 to 12 are often repeated for those color coordinate sets lying outside the said second correlated color gamut.

In order to realize the conversion between the color spaces in an efficient manner use is made of an interpolation. Indeed, if for each pixel a direct conversion should be executed, therefor using a memory wherein the converted values are stored, then for example for a conversion of a RGB to a CMYK by using a usual 8 bits per color a $2^{24} \times 4$ bites memory would be required. Even with the actual data processing capacity the addressing and the use of such a memory capacity is practically not realizable. Direct calculation is, due to the inversion speed, with the actual technology also practically unrealizable.

Figure 9:
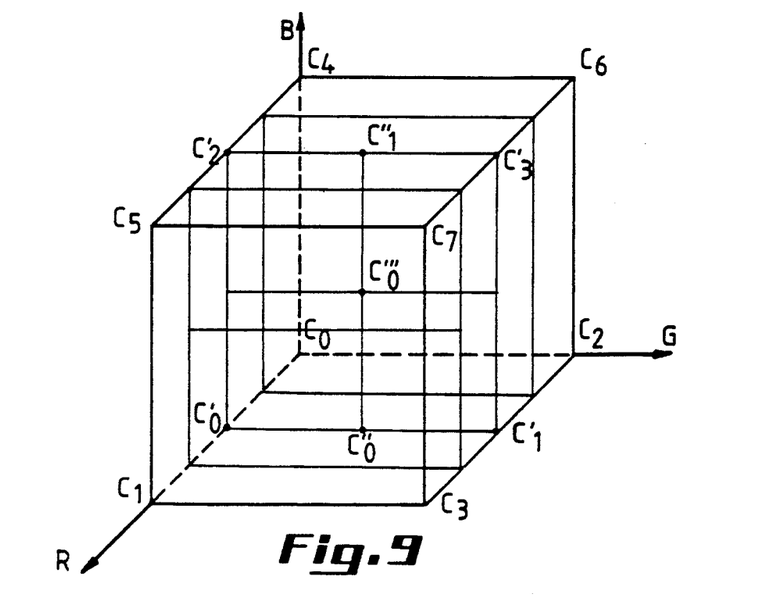
FIG. 9 respectively 10 illustrate the division in subspaces formed by cubes respectively tetrahedrons.

In order to provide a solution therefore it is necessary to limit the amount of stored data and to make use of an interpolation method in order to determine the non-stored data. To this purpose it is also possible to use the known trilinear or quadrilinear interpolations. FIG. 9 shows an example of such a trilinear interpolation wherein a cube in the RGB space is divided in subcubes and wherein for the corner points of each of the sub-cubes predetermined coordinates converted to the second device dependent color space are stored. The values situated inside the partial cubes are then converted by interpolation on basis of the stored values for the corner points.

The converted values stored in the memory were for example determined on basis of hereabove described conversion method, but it will be clear that other transformation methods are applicable.

By the trilinear interpolation banding phenomena quickly arise in the picture, in particular when the fourth dimension is taken into account, such as is for example the case by addition of the color black.

A favourable interpolation method is however obtained, according to the invention, by interpolating over the corner points of a tetrahedron. This method has the advantage that, for example by the reproduction of grey to black saturized colors, a better color quality is obtained. The reason therefor is that the grey axis is an important axis in the color vision and that the fourth dimension is taken into consideration in the interpolation. By using a tetrahedral interpolation, it has been established that substantially no more banding phenomena arise, and that details in the picture are better set-off. With the tetrahedral interpolation method only $n+1$ points (for an n-dimensional space) are now taken into account instead of $2^n$ points used by interpolation over a cube. By considering only $n+1$ points, there is less data smear, a phenomenon which arises when too much predetermined points are taken into account by the interpolation. Some of those points do not contribue to a constructive contribution by determining the color coordinate and will further furnish a negative contribution causing the loss of the character of some details.

Figure 10:
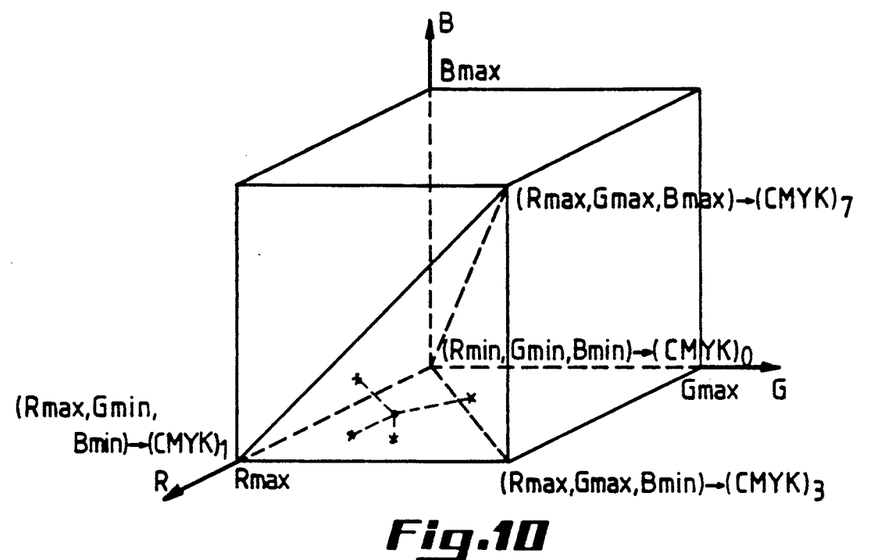

By the tetrahedral interpolation as represented in FIG. 10, wherein it is started from a 3-dimensional color space, the cube is divided into subspaces, formed by smaller cubes, which are then again divided into tetrahedrons, which each time comprise the main axis of the small cube. The choice for having each tetrahedron comprising the main axis is favourable because this axis extends approximately parallel to the grey axis in the color space. Further it has been established that by this choice, there are substantially no banding phenomena anymore even as practically no shift of the colors. The transformed values for the corner points of the smallest cubes are stored in the memory (in an analogous way as is for the quadrilinear interpolation) and serve as basis for the tetrahedral interpolation.

When started from the main axis (axis 111) the tetrahedron is completely determined by ordering the RGB values in incrementing or decrementing sequence, for example by imposing: $Rmax \geq R \geq G \geq B \geq Bmin$. The boundary planes of the hypertetrahedron are then: $R=max$, $R=G$, $G=B$, $B=min$.

In the example shown in FIG. 10 there are six (3!) possible tetrahedrons to be formed, namely:

$R \geq G \geq B$
$R \geq B \geq G$
$G \geq R \geq B$
$G \geq B \geq R$
$B \geq G \geq R$
$B \geq R \geq G$ each of those tetrahedrons comprising thereupon the main axis 111 of the cube. Generally there will thus be for a n-dimensional space n! possible tetrahedrons to be formed.

For each coordinate set belonging to the space, there is checked in which tetrahedron this coordinate set is situated. The color value of a coordinate N situated in a tetrahedron can now be determined as follows:

$$f(N) = \sum_{\text{corner points } i} \frac{d(N, \text{ opposite boundary plane}) f(i)}{d(i, \text{ opposite boundary plane})}$$

wherein f(i) indicates the transformed value belonging to the corner point i which is for example stored in a memory and d is the distance. Preferably an orthonormal projection is chosen to determine the distance.

Figure 11:
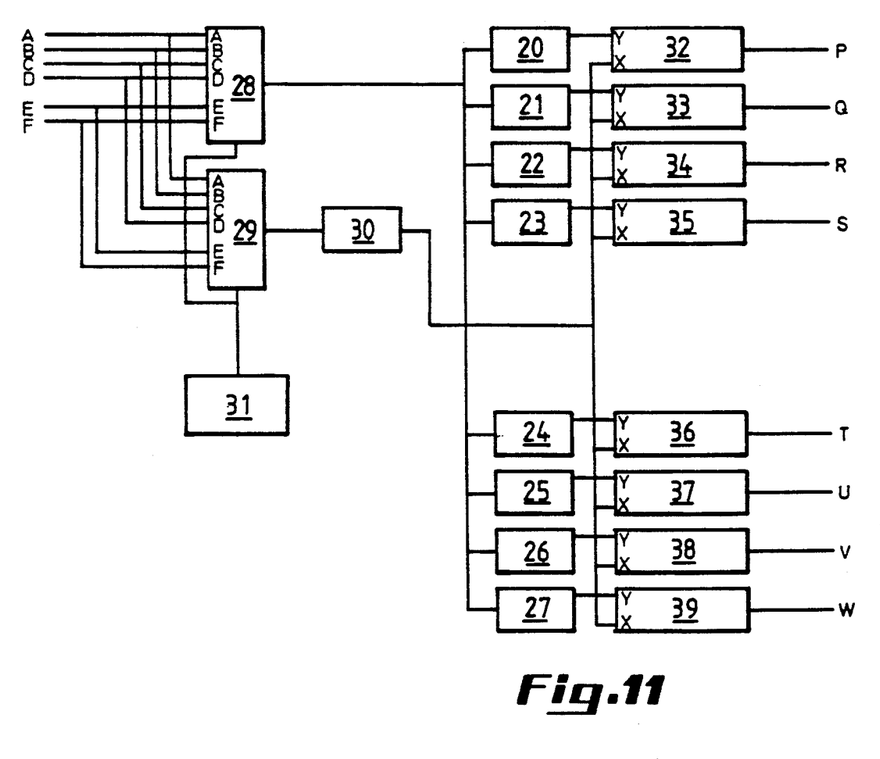
FIG. 11 represents an example of an embodiment of an interpolation member according to the invention.

In order to execute now this transformation with interpolation in a fast and efficient manner, use is made of a transformation-interpolation member of which FIG. 11 shows an embodiment. This transformation-interpolation member is a multi-channel member, suitable to transform a first color coordinate set ABCDEF defined in an n-dimensional space into a second color coordinate set PQRSTUVW defined in a m-dimensional space. It will be clear that the choice of a $n=6$ to a $m=8$ transformation is only given by way of example. The conversion is such that, as described herebefore, both coordinate sets provide a substantial identical color perception in their respective area.

As already described the first n-dimensional color space (ABCDEF) is subdivided in subspaces. Thus for example when the coordinates comprise each 8 bits, the division is realized on basis of the 5 MSB. For each subspace the conversion values for the coordinates of the corner points of that subspace are then stored in the memory. In the chosen example this memory comprises eight memory elements 20 to 27. The number of memory elements to be used is determined by the dimension (m) of the second device dependent space.

An address input of each memory elements 20 to 27 is connected with an output of a first combinative circuit 28, for example of the ASIC type, at which inputs a first color coordinate set ABCDEF is presented. The color coordinate set is also applied to a second combinative circuit 29 whose output is connected to an address input of a further memory element 30. A control input of the first and of the second combinative circuit is connected with a sequence counter 31. A data output of the further memory 30 is each time connected with a first input of the interpolators 32 to 39, whose respective second input is each time connected with a data output of the respective memories 20 to 27. At the outputs of the interpolators the transformed second color coordinate set PQRSTVW is output.

The first combinative circuit 28 is provided to determine from a presented first color coordinate set ABCDEF to which subspace this color coordinate set belongs. The first combinative circuit receives output values originating from a sequence counter 31 by means of which the corner points of the selected subspace are scanned. By an n-dimensional color space and trilinear interpolation the sequence counter 31 will for each presented set supply $2^n$ different output values to the first combinative circuit in order to scan $2^n$ corner points of the subspace. The first combinative circuit hereby makes use of the most significant bits (MBS), for example the 5 MSB, of the presented color coordinate set. These MSB form already a first corner point of the subspace. The remaining $2^n$-corner points are determined by each time adding one to the different coordinates (MA, MB, ..., IF) of the presented set and this in every possible combinations. In table I (given hereunder) the different corner points for n=3-dimensional space are enumerated. These corner points form then the addresses for the memories 20 to 27 and thus the data stored at the addressed location is read and presented to the second input of the interpolators 32 to 39. It will be clear that if the number of memories (20 to 27) and the number of interpolators (32 to 39) is larger than the dimension m of the second device dependent space only as many memories and interpolators will be used as allowed by dimension m.

The second combinative circuit 29 also receives the same output values originating from the sequence counter 31. For each received output value the second combinative circuit 29 forms an address addressing a location in the further memory 30. In that further memory 30 a table is stored which each time indicates the weight coefficient for the output value which corresponds with the indicated corner point in the chosen subspace. The weight coefficients are searched in the table on basis of the least significant bits of the supplied set and of the output value of the sequence counter. Each weight coefficient indicates on its turn the contribution to the output value to be searched corresponding with the supplied coordinate set. As the dimension of the first device dependent color space increases, the number of corner points increases and the relative contribution of the output value corresponding to each corner point in the subspace changes until the searched value corresponds with the supplied set. This implies a modification of the content of the further memory 30. The interpolators make use of the weight coefficient stored in the further memory 30.

The operation of the device shown in FIG. 11 will now be described by means of an example. Suppose a conversion of a RGB to a CMYK color space and suppose 8 bits for each color component. The R respectively B en G color component is supplied to the input A respectively B and C, the inputs D to F remain unused in this example. The values C, M, Y and K are output at the outputs P, Q, R and S. Suppose further that the division in subspaces is realized on basis of the 5 MSB of each color component, further indicate by MI5 for a color I. In this manner the division is identical in each direction and equidistant which simplifies the interpolation. But it will be clear that other choices are also possible and that it is not necessary to maintain an equidistant division.

Because the RGB space is three-dimensional, each subcube comprises eight corner points. The sequence counter together with the first combinative circuit shall have to execute eight steps in order to form eight addresses for each of the memories 20, 21, 22 and 23 (CMYK, 4 dimensions). In table I an example is given of eight subsequent addresses generated by the first combinative circuit and belonging to a same subspace. Further table I represents the value stored in the memory 20 at that address and belonging to the converted value for the color component C belonging to the addressed corner point. For the remaining color components M, Y, K the addressing and conversion are realized in an analogous manner.

TABLE I

| Address | Color component C value |
|---|---|
| $<MR_5, MG_5, MB_5>$ | $C_0$ |
| $<MR_5 + 1, MG_5, MB_5>$ | $C_1$ |
| $<MR_5, MG_5 + 1, MB_5>$ | $C_2$ |
| $<MR_5 + 1, MG_5 + 1, MB_5>$ | $C_3$ |
| $<MR_5, MG_5, MB_5 + 1>$ | $C_4$ |
| $<MR_5 + 1, MG_5, MB_5 + 1>$ | $C_5$ |
| $<MR_5, MG_5 + 1, MB_5 + 1>$ | $C_6$ |
| $<MR_5 + 1, MG_5 + 1, MB_5 + 1>$ | $C_7$ |

The execution of a trilinear interpolation by using the device shown in FIG. 11 will now be described. Suppose once again a conversion RGB→CMYK and once again being started from a subcube as represented in FIG. 9. Consider first an interpolation in the R-direction, which leads to four second-order approximations of the value C to be determined, namely:

$$8 * C'_0 = (8 - LR_3) * C_0 + LR_3 * C_1 \quad (A)$$
$$8 * C'_1 = (8 LR_3) * C_2 + LR_3 * C_3$$
$$8 * C'_2 = (8 - LR_3) * C_4 + LR_3 * C_5$$
$$8 * C'_3 = (8 - LR_3) * C_6 + LR_3 * C_7$$

wherein $LI_3$ corresponds to the 3LSB of the I component. The $C_0'$, $C_1'$, $C_2'$ and $C_3'$ values are represented in FIG. 9.

Thereafter an interpolation in the G-direction is made which results in two second-order approximations:

$$8*C_0''=(5-LG_3)*C_0'LG_3*C_1'$$

$$8*C_1''=(8-LG_3)*C_2'+LG_3*C_3' \quad (B)$$

Finally, an interpolation is made in the B-direction resulting in a fourth-order approximation:

$$8*C_0'''=(8-LB_3)*C_0''+LB_3*C_1'' \quad (C)$$

In order to simplify the calculation of those values and to reduce the number of calculation operations, equation C is rewritten by using the equations A and B:

$$8 * 8 * 8 * C_0''' = (8 - LB_3) * (8 - LG_3) * (8 - LR_3) * C_0 + \quad (D)$$
$$(8 - LB_3) * (8 - LG_3) * (LR_3) * C_1 +$$
$$(8 - LB_3) * (LG_3) * (8 - LR_3) * C_2 +$$
$$(8 - LB_3) * (LG_3) * (LR_3) * C_3 +$$
$$(LB_3) * (8 - LG_3) * (8 - LR_3) * C_4 +$$

-continued $$(LB_3) * (8 - LG_3) * (LR_3) * C_5 +$$

$$(LB_3) * (LG_3) * (8 - LR_3) * C_6 +$$

$$(LB_3) * (LG_3) * (LR_3) * C_7$$

The equation (D) now comprises the values $C_i$ ($0 \leq i \leq 7$) stored in the memory 20 (table I), which $C_i$-value in this equation are each time preceeded by weight coefficients which are stored in the further memory 30. This enables to reduce the number of operations and the realization of the interpolations 32 to 39 is also simplified because they are realized as multiplicater accumulator.

The calculation of the value $Y_{0'''}$, $M_{0'''}$ and $K_{0'''}$ occurs in an analogous way. The transformation of a C,M,Y,K space to a RGB space can also be executed with a device such as shown in FIG. 11. By the latter transformation, not eight but sixteen corner points are considered by the first combinative circuit 28.

The tetrahedral interpolation is also realized by using a device as shown in FIG. 11. However as already described the space is subdivided in tetrahedrons. The latter is for example obtained by first divising the space into cubes and thereafter dividing each cube into tetrahedrons. In this way, the values for corner points of the cube can also be used for the tetrahedrons. For the three-dimensional space, each cube thus comprises six tetrahedrons of which the coordinates of the corner points are also formed by the first combinative circuit 28 and indicate addresses in the memories 20 and 27. By the division in tetrahedrons, preferably there is carefully taken into account the corner points of the cube which is at the basis of the tetrahedral division. Each tetrahedron comprises a series of corner points among them the corner point with the lowest values for all coordinates (Rmin, Gmin, Bmin) and the corner point with the highest values (Rmax, Gmax, Bmax). The remaining corner points of the tetrahedron are corner points the coordinates of which only differ in one element.

Figure 12:
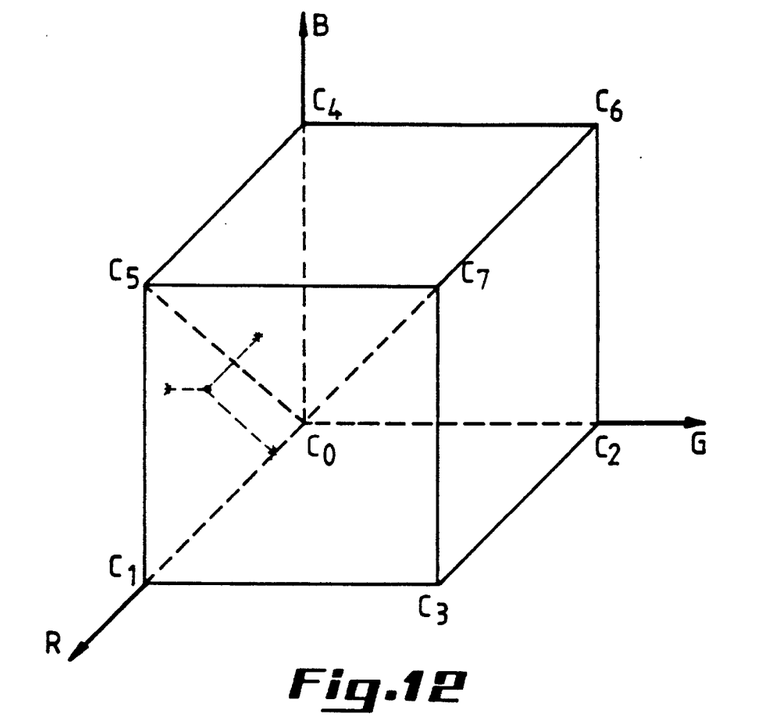
FIG. 12 represents the projection on tetrahedral planes.

The first combinative circuit 28 is now however provided for determining upon supplied color coordinate set to which tetrahedron this set belongs. To this purpose there is checked to which subcube the supplied coordinates belong and thereafter the combinative circuit 28 makes use of the $LR_3$, $LG_3$, $LB_3$ values and compares the coordinates with each other in order to determine which tetrahedron has to be chosen. So for example if $LR_3 \geq LB_3 \geq LG_3$, the tetrahedron with the corner points $C_0$, $C_1$, $C_5$ and $C_7$ will be selected because it comprises the supplied set, such as shown in FIG. 12. The combinative circuit 28 determines then under control of the sequence counter 31 no longer eight but four addresses when a RGB→CMYK conversion is considered.

The four thus obtained addresses correspond with the corner points of the chosen tetrahedron. For these corner points the values of the appertaining color component is stored in the memories 20 to 23. Table II gives a example of a chosen tetrahedron wherein $LR_3 \geq LB_3 \geq LG_3$ and the color components belonging thereto.

TABLE II

| Address | Value Color Component C |
|---|---|
| $<MR_5, MG_5, MB_5>$ | $C_0$ |
| $<MR_5 + 1, MG_5, MB_5>$ | $C_1$ |
| $<MR_5 + 1, MG_5, MB_5 + 1>$ | $C_5$ |
| $<MR_5 + 1, MG_5 + 1, MB_5 + 1>$ | $C_7$ |

The tetrahedral interpolation is now realized as follows. Consider the corner points stored at the address ($MR_5+1$, $MG_5+1$, $MB_5+1$), the contribution of $C_7$ to the C-value to be determined is weight by the factor (E):

$$\frac{d[(r,g,b)\text{-projection on the point in the tetrahedral plane opposite } C_7 \text{ to the considered point}]}{d[C_7 \text{ to its projection in the same reference plane}]}$$

wherein d is the distance taken along parallel lines. The projection is preferably a perpendicular projection. If the distance is taken along orthogonal lines, to the tetrahedral reference plane, the expression (E) becomes: ($LG_3/8$).

In an analogous manner, the contribution of $C_0$, $C_1$ and $C_5$ is determined which respectively contribute $(8-LR_3)/8, (LR_3-LB_3)/8, (LB_3-LG_3)/8$. This gives the C value:

$$8*C=(8-LR_3)*C_0+(LR_3-LB_3)*C_1+(LB_3-LG_3)*C_5+LG_3C_7.$$

These coefficients are stored in the further memory 30 and are addressed by means of the second combinative circuit 29 and are thereafter presented to the interpolators. The M, Y, K contribution is determined in an analogous way.

What is claimed is:

1. A method for converting a color defined in a first n-dimensional device dependent color space to a corresponding color defined in a second m-dimensional ($m \geq n$; $n \geq p$; $m > p$; $p \geq 3$) device dependent color space, wherein said color is first converted from said first device dependent color space to a first device independent color space and thereafter from said first device independent color space to a second device independent color space in order to be there after converted to said second device dependent color space, and wherein for each conversion from one color space to another there is determined a respective mapping algorithm mapping a color coordinate set from said one color space to said other color space, and wherein each device dependent color space comprises a color gamut and said color gamut of said first respectively second device dependent color space is each time by means of said respective mapping algorithm mapped to said first respectively second device independent color space in order to each time define therein a first respectively a second color gamut which is correlated with said first respectively said second device dependent color space and subsequently there being verified if said color coordinate set converted from said first to said second device independent color space is within said correlated color gamut defined within said second device independent color space, and wherein for each $(m-p)^{th}$ color dimension from said second device dependent color space there is each time defined a color value and said color coordinate set of said second device dependent color space is determined on the basis of said color value, which color value defines a further color gamut within said color gamut of said second device dependent color space, which further color gamut is mapped by means of said respective mapping to said second device independent color space in order to define therein a third color gamut and if by said verifying there is established that said converted color coordinate set is outside said third but inside respectively outside said correlated second color gamut that color coordinate set is substituted by a first respectively a second color coordinate set.

2. A method as claimed in claim 1, wherein for said color value, a value is chosen determined in function of said color values of remaining color dimensions.

3. A method as claimed in claim 2, wherein for said color value, a value is chosen in function of a minimum value of remaining p color coordinates.

4. A method as claimed in claim 1, wherein said second color coordinate set is determined by projection of said color coordinate set, obtained by mapping to said second device independent color space, on a boundary plane of said correlated second color gamut.

5. A method as claimed in claim 4, wherein said projection is carried out in a plane with constant hue.

6. A method as claimed in claim 4, wherein said second color coordinate set is obtained by determining for at least one of said color parameters hue, luminance and saturation, a difference between said second color coordinate set obtained by projection and said color coordinate set obtained by mapping to said second device independent color space.

7. A method as claimed in claim 1, wherein said second color coordinate set is obtained by minimizing a difference between a color coordinate set obtained by mapping to said second device independent color space and a further color coordinate set in said second device independent color space obtained by using said color value.

8. A method as claimed in claim 7, wherein for said minimization said color value is respected within predetermined restrictions.

9. A method as claims in claim 7 or 8, wherein said minimization comprises a minimization of a color distance in an Euclidian space.

10. A method as claimed in claim 7 or 8, wherein said first color coordinate set is determined by defining for each $(m-p)^{th}$ color dimension of said second device dependent color space a further color value, and wherein on a basis of said further color value there is determined in said second device independent color space a fourth color gamut which is included within said second color gamut and which comprises at least partially said third color gamut.

11. A method as claimed in claim 7 or 8, wherein said first color coordinate set is determined by defining for each $(m-p)^{th}$ color dimension of said second device dependent color space a further color value, wherein on a basis of said further color value there is determined in said second device independent color space a fourth color gamut which is included within said second color gamut and which comprises at least partially said third color gamut and wherein for determining said further color value an inverse mapping is made of said color coordinate set obtained by mapping from said second device independent color space to said second device dependent color space and wherein for said further color value a value is chosen determined on the basis of a result of said inverse mapping.

12. A method as claimed in claim 1, wherein by converting a first color coordinate set of said first device dependent color space to a corresponding color coordinate set of said second device dependent color space, use is made of an interpolation between predetermined color coordinates.

13. A method as claimed in claim 12, wherein to determine said predetermined color coordinates, said first device dependent color space is subdivided in geometrically each time substantially uniform subspaces wherein each subspace is delimited by corner points, and for each corner point a corresponding color coordinate set of said second device dependent space is stored into a memory.

14. A method as claimed in claim 13, wherein said subspaces are formed by rectangular subspaces.

15. A method as claimed in claim 13, wherein said subspaces are formed by tetrahedral subspaces.

16. A method as claimed in anyone of the claims 13, 14 or 15, wherein for each first color coordinate set to be converted a subspace wherein said first color coordinate set is located, is identified and wherein for said interpolation use is made of said second color coordinates of said corner points of said identified subspace which second color coordinates are stored in said memory.

17. A method as claimed in anyone of the claims 13, 14, or 15 wherein for each first color coordinate set to be converted a subspace wherein said first color coordinate set is located, is identified and wherein for said interpolation use is made of said second color coordinates of said corner points of said identified subspace which second color coordinates are stored in said memory and wherein for said identifying of said subspace use is made of most significant bits of said color coordinate set to be converted in order to determine a first corner point of said subspace to be identified and wherein remaining corner points of the subspace to be identified are identified by incrementation of said most significant bits.

18. A method as claimed in claim 15 wherein for said identifying of said subspace use is made of most significant bits of said color coordinate set to be converted in order to determine a first corner point of said subspace to be identified and wherein the remaining corner points of the subspace to be identified are identified by incrementation of said most significant bits and wherein for identifying a tetrahedron there is first checked on the basis of said most significant bits in which rectangular subspace said color coordinate set is located and thereafter there is checked on the basis of said least significant bits in which tetrahedron belonging to said rectangular subspace said color coordinate set is located.

19. A method as claimed in claim 18, wherein on the basis of said most significant bit addresses are formed for addressing said memory.

20. A method as claimed in anyone of the claims 13, 14 or 15 wherein for each first color coordinate set to be converted a subspace wherein said first color coordinate set is located, is identified and wherein for said interpolation use is made of said second color coordinates of said corner points of said identified subspace which second color coordinates are stored in said memory and wherein for said identifying of said subspace use is made of most significant bits of said color coordinate set to be converted in order to determine a first corner point of said subspace to be identified and wherein remaining corner points of the subspace to be identified are identified by incrementation of said most significant bits and wherein on the basis of said most significant bit addresses are formed for addressing said memory.

21. A method as claimed in anyone of the claims 13, 14, 15, wherein for each first color coordinate set to be converted a subspace wherein said first color coordinate set is located, is identified and wherein for said interpolation use is made of said second color coordinates of said corner points of said identified subspace which second color coordinates are stored in said memory and wherein on the basis of least significant bits of said color coordinate set to be converted weight coefficients are selected which represent a contribution of said color coordinate set to each second color coordinates which are related to said corner points of said identified subspace.

22. A method as claimed in anyone of the claims 13, 14 or 15 wherein for each first color coordinate set to be converted a subspace wherein said first color coordinate set is located, is identified and wherein for said interpolation use is made of said second color coordinates of said corner points of said identified subspace which second color coordinates are stored in said memory and wherein for said identifying of said subspace use is made of most significant bits of said color coordinate set to be converted in order to determine a first corner point of said subspace to be identified and wherein remaining points of the subspace to be identified are identified by incrementation of said most significant bits and wherein on the basis of said most significant bit addresses are formed for addressing said memory and wherein on the basis of least significant bits of said coordinate set to be converted weight coefficients are selected which represent a contribution of said color coordinate set to each second color coordinates which are related to said corner points of said identified subspace and wherein said interpolation is realized on the basis of said second color coordinate set and said weight coefficients.

23. A device for application of a method as claimed in claim 1, which is provided with mapping means for converting the color from said first device dependent color space to said first color independent color space and thereafter via said second device independent color space to said second device dependent color space, which device further comprises verification means provided for verifying if said color coordinate set transformed from said first to said second device independent color space is within said color gamut defined within said second device independent color space, wherein said device comprises a first memory provided for each time storing a color value, for each $(m-p)^{th}$ color dimension of said second device dependent color space, which first memory is connected with a color coordinate set generator provided for generating said color coordinate set of said second device dependent color space on the basis of said color value, which color value defines within the color gamut of said second device dependent color space a further color gamut, which mapping means are further provided for mapping by means of said respective mapping said further color gamut to said second device independent color space in order to define there a third color gamut, and wherein said verification means are connected with substitution means provided for substituting said color coordinate set by a first respectively a second color coordinate set when it has been established that said converted color coordinate set is outside said third but inside respectively outside said correlated second gamut.

24. A device as claimed in claim 23, wherein said substitution means are provided for generating said second color coordinate set by means of a projection of said color coordinate set obtained by mapping to said second device independent color space on a boundary surface of said correlated second color gamut.

25. A device as claimed in claim 23, wherein said substitution means are provided for generating said second color coordinate set by determining for at least one of the color parameters hue, luminance and saturation a difference between said second color coordinate set obtained by projection and said color coordinate set obtained by mapping and by minimizing thereafter said difference.

26. A device as claimed in any one of the claims 23, 24 or 25, wherein said substitution means are provided for generating said first color coordinate set by determining a difference between said color coordinate set obtained by mapping to said second device independent color space and a further color coordinate set in said second device independent color space obtained by using said color value and by means of thereafter minimizing said difference.

27. A device for performing a method as claimed in claim 13, wherein said device comprises a second memory provided for storing predetermined conversion values for said corner points and a third memory provided for storing weight coefficients, which second memory comprises an address input connected with a first combinative circuit which is provided for determining from a supplied first color coordinate set in which subspace said first color coordinate set is located and for forming an address for addressing in said memory said conversion values belonging to said determined subspace, which third memory comprises an address input connected with an output of a second combinatorial circuit which is provided for selecting from a supplied first color coordinate set a set of weight coefficient, which third memory is connected to a first input of an interpolation unit which second input is connected with a data output of said memory.

* * * * *